United States Patent
Morin

(10) Patent No.: US 11,811,880 B2
(45) Date of Patent: Nov. 7, 2023

(54) EDGE LINK REDUNDANCY

(71) Applicant: Adaptiv Networks Inc., Gatineau (CA)

(72) Inventor: Yannick Morin, Moose Creek (CA)

(73) Assignee: Adaptiv Networks Inc., Gatineau (CA)

( * ) Notice: Subject to any disclaimer, the term of this patent is extended or adjusted under 35 U.S.C. 154(b) by 0 days.

(21) Appl. No.: 17/354,317

(22) Filed: Jun. 22, 2021

(65) Prior Publication Data

US 2022/0407922 A1 Dec. 22, 2022

(51) Int. Cl.
| | |
|---|---|
| H04L 29/08 | (2006.01) |
| H04L 12/26 | (2006.01) |
| H04L 12/725 | (2013.01) |
| H04L 12/707 | (2013.01) |
| H04L 67/142 | (2022.01) |
| H04L 45/00 | (2022.01) |
| H04L 45/302 | (2022.01) |
| H04L 43/10 | (2022.01) |

(52) U.S. Cl.
CPC ............ *H04L 67/142* (2013.01); *H04L 43/10* (2013.01); *H04L 45/22* (2013.01); *H04L 45/306* (2013.01)

(58) Field of Classification Search
CPC ..... H04L 67/142; H04L 67/148; H04L 43/10; H04L 43/16; H04L 45/22; H04L 45/24; H04L 45/306
USPC .......................................................... 709/224
See application file for complete search history.

(56) References Cited

U.S. PATENT DOCUMENTS

| | | | |
|---|---|---|---|
| 7,133,365 B2 | 11/2006 | Klinker et al. | |
| 7,315,512 B2 | 1/2008 | Xi | |
| 9,191,318 B1 | 11/2015 | Van de Velde et al. | |
| 9,521,069 B2 | 12/2016 | Gillon et al. | |
| 9,992,039 B2 | 6/2018 | Anandan et al. | |
| 10,104,130 B2 * | 10/2018 | O'Connor | H04L 65/1063 |
| 10,700,962 B2 | 6/2020 | Karthikeyan et al. | |
| 2003/0120716 A1 * | 6/2003 | McClellan | H04L 69/163 709/201 |
| 2005/0073998 A1 * | 4/2005 | Zhu | H04L 65/1101 370/352 |
| 2006/0239243 A1 * | 10/2006 | Li | H04Q 3/0045 370/352 |
| 2008/0013556 A1 * | 1/2008 | Kaippallimalil | H04W 8/065 370/401 |

(Continued)

FOREIGN PATENT DOCUMENTS

WO    WO-2010099984 A1 *    9/2010    ......... H04L 12/2863

OTHER PUBLICATIONS

PCT International Search Report for orresponding PCT Application No. PCT/CA2022/050994 dated Sep. 20, 2022.

(Continued)

*Primary Examiner* — Ruolei Zong
(74) *Attorney, Agent, or Firm* — Stratford Group Ltd.

(57) ABSTRACT

A system to allow smooth transition between a plurality of communication sessions between a plurality of edge-links comprising a first of said plurality of communication sessions carrying traffic from one or more applications. An edge-link redundancy device, coupled to said plurality of communication sessions, monitors the status of said plurality of communication sessions. The edge-link redundancy device routing applications initiated to a second of said plurality of communication sessions when the status of said plurality of communication sessions changes to a predetermined state.

10 Claims, 2 Drawing Sheets

(56) References Cited

U.S. PATENT DOCUMENTS

| | | | |
|---|---|---|---|
| 2009/0106571 A1* | 4/2009 | Low | G06F 9/5094 |
| | | | 709/224 |
| 2016/0295449 A1* | 10/2016 | Seenappa | H04L 47/629 |
| 2019/0020534 A1* | 1/2019 | Volz | H04L 67/51 |
| 2019/0342200 A1* | 11/2019 | Juneja | H04L 67/147 |
| 2020/0120015 A1 | 4/2020 | Boucadair et al. | |
| 2020/0186460 A1* | 6/2020 | Power | H04L 45/22 |

OTHER PUBLICATIONS

PCT Written Opinion of the International Searching Authority for PCT Application No. PCT/CA2022/050994 dated Sep. 20, 2022.

* cited by examiner

EDGE LINK REDUNDANCY

BACKGROUND

IP (Information Protocol) networks can be redundant within the core of the network. Access to the IP core is via an edge-link. The edge-link is also known as the last-mile or the access-link. The edge-link is a single point of failure for communicating devices (when the core is redundant).

FIG. 1 depicts the prior art to work around the lack of redundancy on the edge-link. Multiple edge-links can be used, for example, edge-link A 104 and edge-link B 108. Multiple edge-links can provide a form of cold standby/redundancy. Being cold standby when electronic communication must transition between the links (sometimes called primary-link and backup-link) all communications are broken, the applications must detect the break, and must establish a new communication with the far-end.

Existing solutions include bonding all edge-link traffic (e.g. From edge-link A 104 and edge-link B 108) to a remote server 110. The server itself must be redundant and within a redundant network. This adds redundancy to the last mile. But redundancy is lost when the remote point fails. Also, this solution cannot work without a remote server, acting as a proxy.

There is a need to provide edge link redundancy without the use of a remote server 110.

BRIEF SUMMARY

In one embodiment, a system to allow smooth transition between a plurality of communication sessions between a plurality of edge-links is disclosed. The system comprises a first of said plurality of communication sessions carrying traffic from one or more applications. An edge-link redundancy device coupled to said plurality of communication sessions monitors the status of said plurality of communication sessions, wherein said edge-link redundancy device routing applications initiated to a second of said plurality of communication sessions when the status of said plurality of communication sessions changes to a predetermined state.

In another embodiment, the edge-link redundancy device selects the communication session to be used when an application is initiated, based on the status of said communication sessions and other policies.

In another embodiment, a method to allow smooth transition between a plurality of communication sessions between a plurality of edge-links is disclosed. The method comprises the steps of monitoring, by an edge-link redundancy device coupled to said plurality of communication sessions, the status of said plurality of communication sessions. Routing, by said edge-link redundancy device, applications initiated to a second of said plurality of communication sessions when the status of said plurality of communication sessions changes to a predetermined state.

In another embodiment, the method further comprises selecting the communication session to be used when an application is initiated, based on the status of said communication sessions and other policies.

In another embodiment, the status of the communication session is determined using a ping to a server.

In another embodiment, the status of the communication session is determined based on the performance of the communication session.

In another embodiment, the policies include cost and current bandwidth usage of the communication session.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
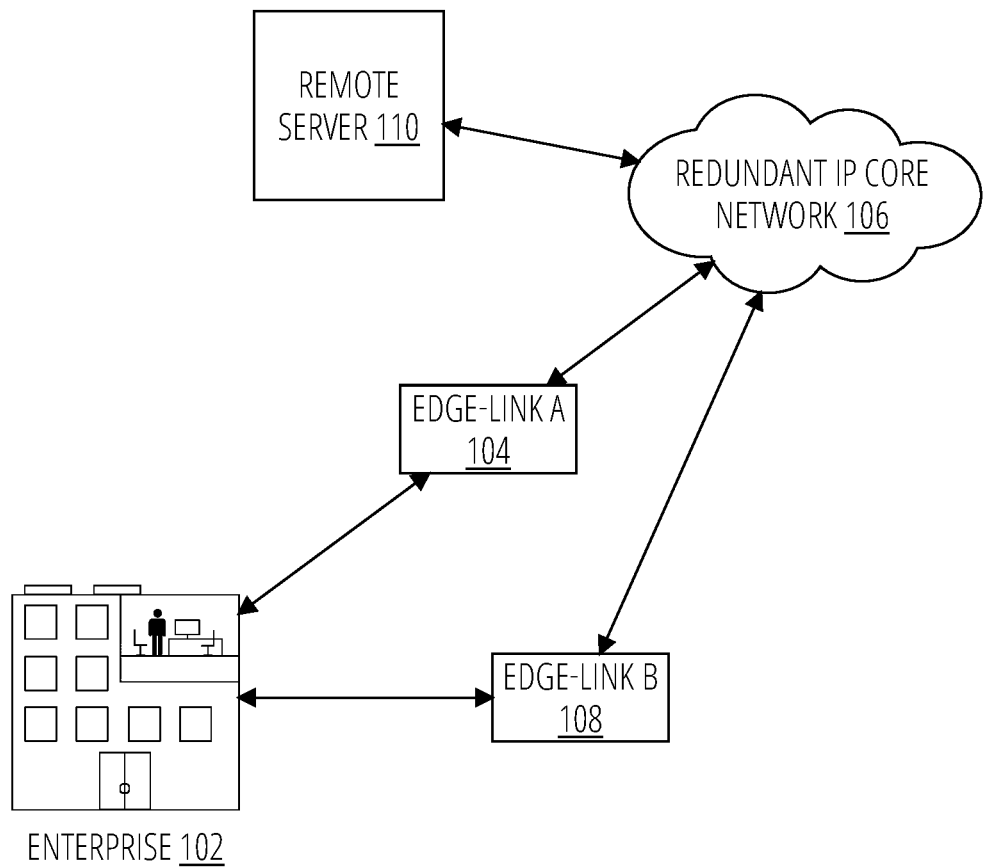
FIG. 1 illustrates existing art to provide edge link redundancy via remote server.
Figure 2:
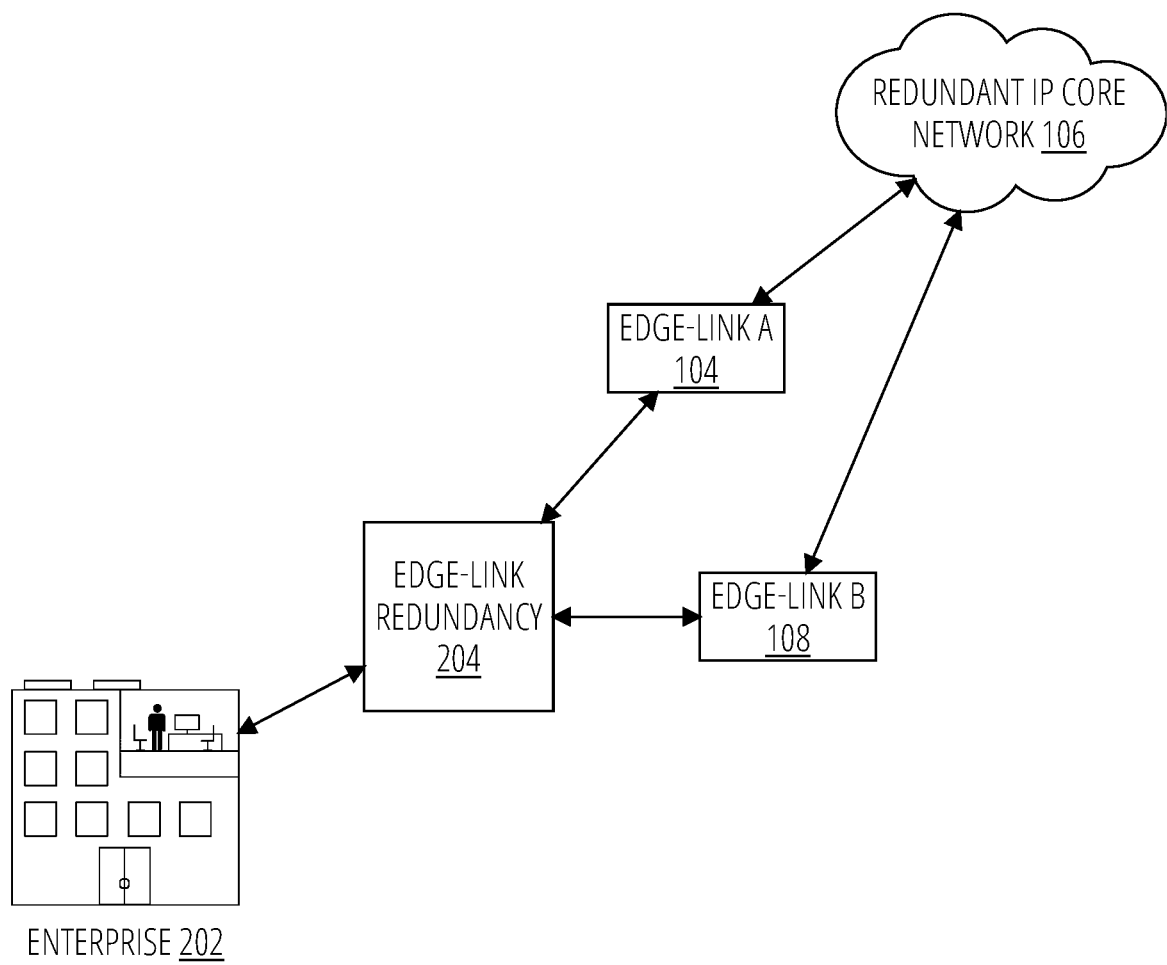
FIG. 2 illustrates a system with edge link redundancy without remote server.

FIG. 2 depicts an enterprise 102 (or a home) which has two or more edge-links (e.g. Edge-link A 104 and edge-link B 108) to access the redundant IP core network 106. An edge-link redundancy 204 device is place in the enterprise 102 to manage the edge-links. The edge-link A 104 and edge-link B 108 handle a first communication session and a second communication session respectively, each communication session can carry traffic from one or more applications or flows (e.g. voice, video, data etc.).

The edge-link redundancy 204 device aggregates traffic from the edge-links and manages the first and second communication sessions. The edge-link redundancy 204 device monitors the status of the communication sessions. The monitoring is done by regular attempts to reach one or more known server (e.g. ping tests to a google server) in the network 106. The monitoring can include a simple connectivity test, and/or optionally include measuring performance (e.g. but not limited to, delay, delay variance or loss) to the known server. The status monitoring determines a state of the communication session such as, but not limited to, active or inactive.

Using multiple servers to test connectivity reduce the falsehood of declaring a network 106 issue over an edge-link when a ping server has an issue. Also, network 106 can lose packets and therefore the actual metric to declare a communication issue over an edge-link is when a predetermined threshold of expected ping replies are not received.

The edge-link redundancy 204 device can optionally monitor the performance of the applications that are active to determine whether the quality of the communication session is degrading and updating the status as a function of this determination.

When the performance of the first communication session degrades below a threshold or the connectivity is lost, a transition is initiated. The status of the communication session is changed to "inactive" (or other status indicating that this communication session should no longer be used). The applications that are initiated after the change are routed to the second communication session. Meanwhile the other applications continue to the first communication session until they are completed, providing for a smooth transition to the second communication session.

Optionally a timer of a configurable value is used to allow the applications to complete over the first communication session. When the timer expires, the applications' communication path is terminated. Typically, the application detects that the communication path is lost and will re-establish a new communication path over the second communication session. Alternatively, The edge-link redundancy 204 device re-establishes the path over the second communication session.

When a new application starts the edge-link redundancy 204 device selects the first or second communication session based on the one that has the best performance and optionally other policies.

Other policies that can be used by the edge-link redundancy 204 to decide which communication session to use for an application. The policies can include, for example but not limited to cost, monthly bandwidth usage etc.

A user may also perform a manual soft switch from the first communication session to the second communication session (or vice-versa) by sending a command to the edge-link redundancy 204 device such that all applications initiated going forward are routed to the other communication session.

In another embodiment, the edge-link redundancy 204 device manages a plurality of edge-links with corresponding plurality of communication sessions. The edge-link redundancy 204 device monitors each communication session and determines which communication session should be used when an application is initiated, based on performance, policies, and other parameters. The plurality of communication sessions can be ranked in priority of usage based on their current status and other parameters. Therefore, new applications initiated will be routed to a different communication session based on the status and policies. For example, a video-conferencing call may use a different communication session than a large file transfer depending on the package of the service provider handling the communication session.

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient but is intended to cover the application or implementation without departing from the spirit or scope of the claims of the present invention.

What is claimed is:

1. A system to allow smooth transition between a plurality of communication sessions between a plurality of edge-links comprising:
    said plurality of communication sessions coupled to a redundant IP core network, via said plurality of edge-links, for carrying traffic from one or more applications;
    said redundant IP core network comprising at least two servers for reducing falsehood of a network issue;
    an edge-link redundancy device coupled to said plurality of communication sessions, via said plurality of edge-links, having a processor for aggregating said traffic from said edge-links, managing said plurality of communication sessions and monitoring the status of said plurality of communication sessions;
    said edge-link redundancy device for determining when the status of a first of said plurality of communication sessions changes to a predetermined state, and for at least a time period subsequent to said determination:
        maintaining use of said first communication session by first applications which were using said first communication session at the time of said determination, while routing, via at least one network switch, second applications initiated after said time of determination to a second of said plurality of communication sessions.

2. The system of claim 1 wherein the edge-link redundancy device selects the communication session to be used when an application is initiated, based on the status of said communication sessions and other policies.

3. The system of claim 1 wherein said status of the communication session is determined using a ping to a server.

4. The system of claim 1 wherein said status of the communication session is determined based on the performance of the communication session.

5. The system of claim 2 wherein said policies include cost and current bandwidth usage of the communication session.

6. A method to allow smooth transition between a plurality of communication sessions between a plurality of edge-links comprising:
    monitoring, by a processor from an edge-link redundancy device coupled to said plurality of communication sessions coupled to a redundant IP core network, the status of said plurality of communication sessions;
    carrying, by said plurality of edge-links, traffic from one or more applications;
    aggregating, by said processor from said edge-link redundancy device, said traffic from said plurality of edge-links;
    managing, by said processor from said edge-link redundancy device, said plurality of communication sessions;
    determining when the status of a first of said plurality of communication sessions changes to a predetermined state; and
    for at least a time period subsequent to said determination:
        maintaining use of said first communication session by first applications which were using said first communication session at the time of said determination, while routing, by an at least one network switch from said edge-link redundancy device, applications initiated to a second of said plurality of communication sessions.

7. The method of claim 6 further comprising selecting the communication session to be used when an application is initiated, based on the status of said communication sessions and other policies.

8. The method of claim 6 wherein said status of the communication session is determined using a ping to a server.

9. The method of claim 6 wherein said status of the communication session is determined based on the performance of the communication session.

10. The method of claim 7 wherein said policies include cost and current bandwidth usage of the communication session.

* * * * *